US006959431B1

(12) United States Patent
Shiels et al.

(10) Patent No.: US 6,959,431 B1
(45) Date of Patent: Oct. 25, 2005

(54) SYSTEM AND METHOD TO MEASURE AND REPORT ON EFFECTIVENESS OF SOFTWARE PROGRAM TESTING

(75) Inventors: Pamela L. Shiels, Harrison Township, MI (US); William Noble, South Lyon, MI (US); Michael A. Horwitz, Southfield, MI (US); David Lagermeier, Plymouth, MN (US)

(73) Assignee: Compuware Corporation, Detroit, MI (US)

( * ) Notice: Subject to any disclaimer, the term of this patent is extended or adjusted under 35 U.S.C. 154(b) by 0 days.

(21) Appl. No.: 09/504,219

(22) Filed: Feb. 15, 2000

Related U.S. Application Data
(60) Provisional application No. 60/134,177, filed on May 13, 1999.

(51) Int. Cl.[7] .............................. G06F 9/44; G06F 11/00
(52) U.S. Cl. ........................ 717/124; 717/125; 717/131; 717/132; 714/38
(58) Field of Search ................................ 717/124, 125, 717/131, 132; 714/38

(56) References Cited

U.S. PATENT DOCUMENTS

| | | | | |
|---|---|---|---|---|
| 4,742,466 A | | 5/1988 | Ochiai et al. | |
| 4,853,851 A | | 8/1989 | Horsch et al. | |
| 4,872,167 A | * | 10/1989 | Maezawa et al. | 714/38 |
| 5,050,168 A | * | 9/1991 | Paterson | 714/38 |
| 5,446,911 A | * | 8/1995 | Juso et al. | 717/123 |
| 5,517,629 A | * | 5/1996 | Boland | 714/38 |
| 5,613,118 A | * | 3/1997 | Heisch et al. | 717/158 |
| 5,655,122 A | * | 8/1997 | Wu | 717/152 |
| 5,748,878 A | * | 5/1998 | Rees et al. | 717/131 |
| 5,758,061 A | * | 5/1998 | Plum | 717/131 |
| 5,778,169 A | * | 7/1998 | Reinhardt | 714/38 |
| 5,832,271 A | * | 11/1998 | Devanbu | 717/131 |
| 5,933,640 A | * | 8/1999 | Dion | 717/132 |
| 5,950,009 A | * | 9/1999 | Bortnikov et al. | 717/158 |
| 6,049,666 A | * | 4/2000 | Bennett et al. | 717/130 |
| 6,071,316 A | * | 6/2000 | Goossen et al. | 717/126 |
| 6,126,329 A | * | 10/2000 | Bennett et al. | 717/130 |
| 6,149,318 A | * | 11/2000 | Chase et al. | 717/131 |
| 6,161,200 A | * | 12/2000 | Rees et al. | 717/131 |
| 6,170,083 B1 | * | 1/2001 | Adl-Tabatabai | 717/158 |
| 6,199,199 B1 | * | 3/2001 | Johnston et al. | 717/125 |
| 6,226,787 B1 | * | 5/2001 | Serra et al. | 717/125 |
| 6,311,327 B1 | * | 10/2001 | O'Brien et al. | 717/131 |
| 6,330,692 B1 | * | 12/2001 | Kamuro et al. | 717/124 |

OTHER PUBLICATIONS

Pavlopoulou, et al., "Residual Test Coverage Monitoring", 1999, ACM, p. 277–284.*
H. Agrawal, "Dominators, Super Blocks, and Program Coverage", 1994, ACM, p. 25–34.*
R. Bernecky, "EGREGION: A Branch Coverage Tool for APL", 1999 ACM, p. 3–14.*
Horgan, et al., "Data Flow Coverage and the C Language", 1991, ACM, p. 87–97.*

* cited by examiner

*Primary Examiner*—Todd Ingberg
*Assistant Examiner*—Qamrun Nahar
(74) *Attorney, Agent, or Firm*—Fenwick & West LLP (57) ABSTRACT

A computer-implemented method and system for measuring and reporting on the effectiveness of software program testing combines information from existing debugging and analysis tools to provide various displays of the logical paths of a program under test that have been executed, as well as related data. Logical path execution is determined based on the number of times a decision block has been executed and the number of times statements coming out of the decision block have been executed.

36 Claims, 8 Drawing Sheets

SYSTEM AND METHOD TO MEASURE AND REPORT ON EFFECTIVENESS OF SOFTWARE PROGRAM TESTING

RELATED APPLICATION

This application claims priority from U.S. Provisional Pat. No. 60/134,177 filed May 13, 1999.

BACKGROUND OF THE INVENTION

1. Field of the Invention

The present invention relates generally to the field of software testing and specifically to evaluating how well a given computer program or set of programs have been tested.

2. Description of Backgound Art

Software developers commonly spend a great deal of time and money testing the computer programs they develop. This is especially true for development of so-called "mission- critical" programs, such as those used in business accounting, payroll and billing systems.

Oftentimes, managers, developers and testers are unable to verify how well software has been tested in order to predict the likelihood that untested problems may emerge at some later time. Though extensive testing may have been undertaken, significant portions of the program logic may not have been exercised.

Certain other solutions display the structure of a program to be tested and assist testers in identifying portions of the program that should be tested. For example, the McCABE TEST product provided by McCabe & Associates, Columbia, Md., is advertised as providing a visual environment showing graphical displays of test paths and visually identifying the most complex areas to help focus testing efforts. This product is further advertised as identifying tested and untested path and pinpointing problematic areas. The product is asserted to provide "multiple levels of code coverage including unit level, integration level, path coverage, branch coverage, and Boolean coverage." Thus, this product is advertised to allow one to identify which parts of a system remain untested.

The XPEDITER debugging product, provided by Compuware Corporation of Farmington Hills, Mich., identifies which lines of a program have been executed, but does not in itself indicate how much of a program's logic has been executed, since different logic paths may invoke the same program lines under different logical circumstances. The XPEDITER product permits programmers and testers to watch source code execute as well as to control program execution by suspending executing, displaying and changing variables, altering logic, setting statement execution counts, and resuming execution from a desired point in the program. The CICS version of the XPEDITER product further includes a file utility for editing and browsing VSAM, temporary storage and transient data files for debugging applications running in CICS.

While testing every line of executable code in a program will be expected to uncover many errors in the program, it is insufficient since a line of code may execute properly under one set of conditions and not under another set of conditions. For example, consider a program represented in pseudo code as:

```
begin
b=input data;
if b>0, then b=b+3;
output=sqrt(b);
end.
```

If this program is tested with input data greater than zero, each program statement will execute, but only one of the two logical paths of the program will have been tested (i.e., the path with b>0). Such testing is insufficient, since the other logical path (i.e., the path with $b \leq 0$) will always result in an error caused by attempting to find the square root of a negative number.

Therefore, for the testing to be a reliable indicator of actual program performance, it is important to ensure not only that all statements of the program are executed, but that the tester be able to tell which of the logical paths of the program have been tested and which have not.

Such path testing can be helpful in uncovering common, but difficult to locate, bugs such as are caused by attempts to divide by zero and date errors caused by transitions from the years 19___ to 20___.

Some related issues are addressed in U.S. Pat. No. 4,853,851, which discloses a method of determining static results as well as which program paths have been executed, and representing non-executed statements and paths. However, this patent only discloses use of difference between two instruction addresses to determine whether or not a branch instruction has been executed, which limits applicability of this technique to low-level programming languages such as assembly language and microcode. Additionally, this technique calls for the use of special-purpose hardware to collect coverage results. Still farther, this disclosure does not specify the manner in which coverage results are reported.

Collection of execution data is also addressed in U.S. Pat. No. 5,050,168, but this reference does not address any manner of static analysis of program structure or reporting of path coverage.

What is needed is an improved system and method for testing computer programs that allows computer programmers and quality assurance specialists to (i) collect the results of their testing efforts and create an audit trail of program test execution; (ii) specify recording criteria to identify the percentage of an application that was exercised and the amount that it was exercised, determine what percentage of modified code in a program has been tested based on the tests already completed; and (iii) view graphical structure charts to determine requirements for additional test data and user input. In particular, it would be desirable for a system to take advantage of existing debugger and analyzer components already installed on a mainframe computer of a data processing system in order to achieve the operation described above.

SUMMARY OF THE INVENTION

In accordance with the present invention, there is provided a system that uses a debugging tool to collect information about the lines of code that are executed during the running of a test. An analyzer then processes this information to produce therefrom graphical displays and reports.

In one aspect of the invention, the program under test is executed on a mainframe computer.

In another aspect of the invention, the debugging tool is implemented as a software program executing on a mainframe computer with a user interface on a workstation computer.

In still another aspect of the invention, the analyzer is implemented as a software program executing on a workstation computer.

In a further aspect of the invention, the analyzer generates a structural display representative of the logical decision points of the program.

In yet another aspect of the invention, the analyzer combines the information from the debugging tool concerning which lines of code have been executed with structural information about the program to determine how many of the logical paths of the program have been executed.

In still a further aspect of the invention, the analyzer reports results in the same high-level language corresponding to that which the program under test is written in, thereby allowing the tester to easily identify additional tests to be run.

In another aspect of the invention, dynamic analysis is accomplished by recording how many times a given statement in the program under test has been executed, and collecting and reporting such information on program statements using the debugging tool.

In still another aspect of the invention, the analyzer uses an algorithm to determine from the execution data whether or not a particular logical path in the program has been executed. The algorithm determines whether a path has been taken based on the number of times the decision block has been executed and the number of times the statements coming out of the decision block have been executed. In the above pseudo code, the 'if' statement is a decision block. If the 'if' statement has been executed three times and the 'then' statement has been executed two times, then it is certain that both paths out of the execution block have been taken. If the 'then' statement had been executed the same number of times as the 'if' statement, then it is only known that the path that contained the 'then' statement was executed.

In accordance with the present invention, no special hardware as in known systems is needed, and a system in accordance with the present invention can readily be implemented without need for significant changes within existing batch or CICS debuggers and analyzers installed on mainframe computers, using instead relatively simple extensions to portions of such existing conventional debuggers and analyzers as are implemented for operation on workstations as communicating with such mainframe computers.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The figures depict a preferred embodiment of the present invention for purposes of if illustration only. One skilled in the art will readily recognize from the following discussion that alternative embodiments of the structures and methods illustrated herein may be employed without departing from the principles of the invention described herein.

Figure 1:
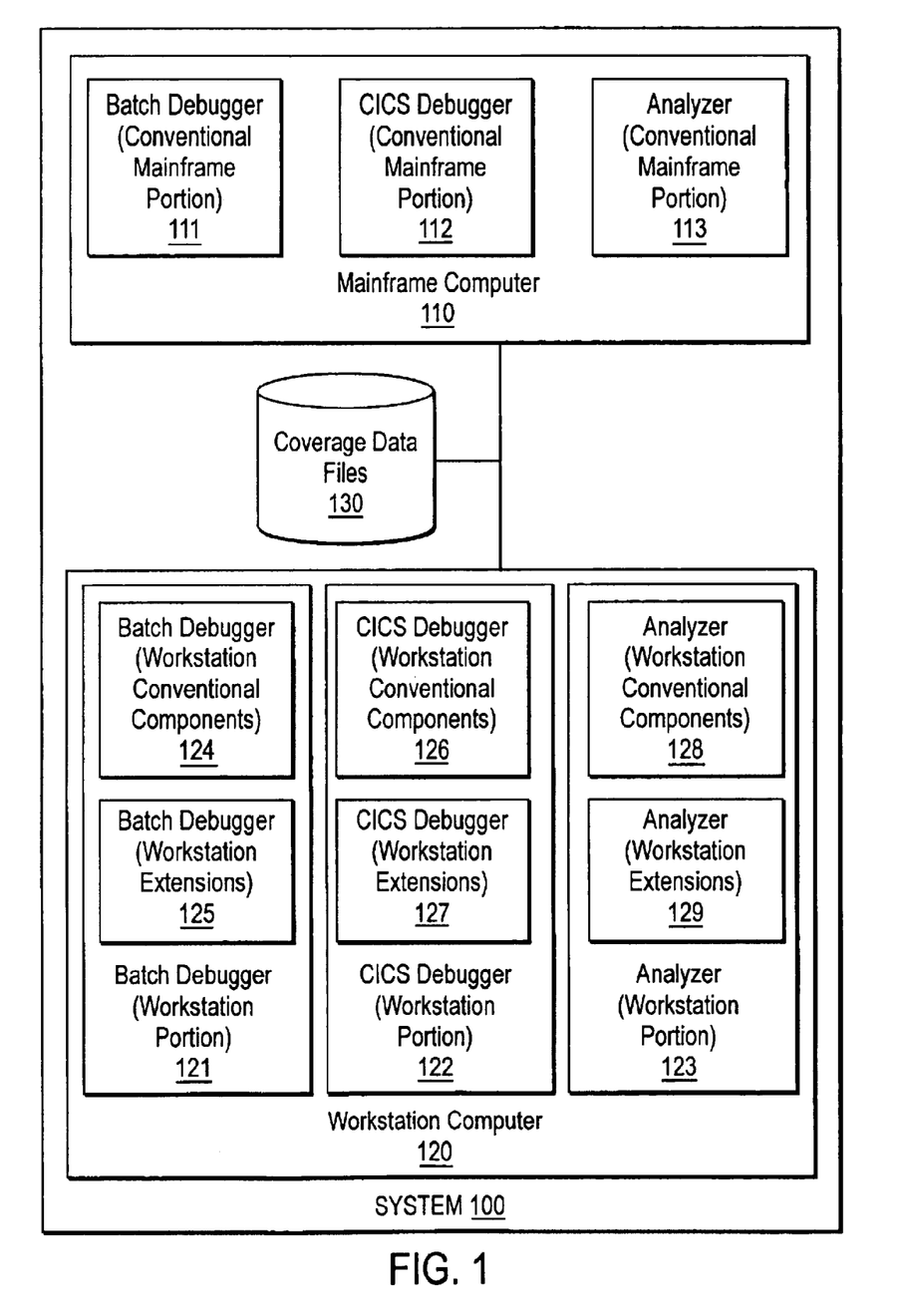
FIG. 1 is a block diagram of the overall architecture of an embodiment of a software testing system in accordance with the present invention.

Referring now to FIG. 1, there is shown a block diagram of the overall architecture of a software testing system 100 in accordance with the present invention. The example shown in FIG. 1 includes both a batch debugger 111/121 and a CICS debugger 112/122. These debuggers provide test coverage data stored in coverage data file subsystem 130. An analyzer subsystem 113/123 uses this data as input for determining test coverage as detailed below.

In a preferred embodiment, the subsystems described above are implemented in part on a mainframe computer 110 and in part on a workstation computer 120, and for purposes of illustration, each of the debugger and analyzer subsystems 111/121, 112/122, and 113/123 are shown as having mainframe portions (i.e., 111, 112, and 113, respectively) and workstation portions (i.e., 121, 122, 123, respectively). Those skilled in the art will recognize that in some applications, any or all of these components may be distributed as shown, may reside solely on either mainframe computer 110 or workstation computer 120, or may be distributed among other processing devices, as desired.

In a preferred embodiment, batch debugger 111/121 is implemented as workstation extensions 125 operating with a conventional batch debugger 111/124 implemented partially on mainframe computer 110 and partially on workstation 120. In a preferred embodiment, conventional batch debugger 111/124 is implemented by the XPEDITER batch debugger product available from Compuware Corporation in Farmington Hills, Mich. The extensions 125 to this product are as described below. Those knowledgeable about conventional batch debuggers will recognize that extensions as described herein, or other modifications, could readily be made to other conventional batch debuggers as well in order to achieve the operation described herein.

More specifically, in a preferred embodiment, a Begin Coverage extension is made to conventional batch debugger 111/124 to automate the setting of the execution counters. Additionally, a Save Coverage extension is made to retrieve the values of the execution counters and save them to the coverage data file subsystem 130. These extensions are described in greater detail below.

In a preferred embodiment, CICS debugger 112/122 is implemented as workstation extensions 127 operating with a conventional CICS debugger 112/126, in this case the XPEDITER CICS debugger product available from Compuware Corporation. The extensions to this product are as described below. Again, those knowledgeable about conventional CICS debuggers will recognize that extensions as described herein, or other modifications, could readily be made to other conventional CICS debuggers as well in order to achieve the operation described herein. A Begin Coverage extension is made to automate the setting of the execution counters. A Save Coverage extension is made to retrieve the values of the execution counters and save them to the coverage data file subsystem 130.

In a preferred embodiment, coverage data files subsystem 130 is implemented by a conventional file storage system.

In a preferred embodiment, analyzer 113/123 is also implemented by extending a conventional analysis system, as described below. In a preferred embodiment, the XPEDITER+analysis system provided by Compuware Corporation is extended to provide analyzer 113/123. Those knowledgeable about analysis subsystems will recognize that extensions as described herein, or other modifications, could readily be made to other conventional analysis subsystems in order to achieve the operation described herein.

In a preferred embodiment, batch debugger 111/121, CICS debugger 112/122, and analyzer 113/123 are integrated into a single software package referred to herein as a "workbench." In a preferred embodiment portions 121, 122 of the batch and CICS debugger subsystems providing user interface functions, as well as the entire analyzer 123 are implemented to be operable on workstation computer 120, which is a conventional personal computer, such as produced by IBM, DELL and Compaq. While FIG. 1 shows that portions of the analyzer 113 may also be implemented for operation on mainframe computer 110, in a preferred embodiment the conventional analyzer does not have any mainframe portion 113, and the analyzer is entirely implemented by an analyzer subsystem 123 operable on workstation computer 120. Those skilled in the art will recognize that other implementations could make use of a mainframe analyzer portion 113, particularly in instances where there are such conventional mainframe analyzer components. In a preferred embodiment, the batch and CICS debuggers include conventional mainframe components 111 and 112 implemented on mainframe computer 110, which is a conventional mainframe computer system, such as an IBM System/390. It should be recognized that other implementations could also be used in accordance with the present invention. Notably, an advantage provided in accordance with the present invention is that mainame components 111, 112, and even 113 (if applicable) require no extension or modification of any sort.

Therefore, embodiments of the invention may be implemented using mainframe systems having existing debuggers and analyzers without making any changes whatsoever to the mainframe components of such debuggers/analyzers. This provides a potential advantage in not disrupting in any way other uses that may be made of such conventional mainframe components, as well as obviating the need for program development work on both the workstation and mainfifame platforms.

Workstation subsystems for the batch debugger 121, CICS debugger 122, and analyzer 123 each contain components from existing conventional debuggers/analyzers, 124, 126, 128, as well as corresponding extensions 125, 127, 129 to provide the operation described herein.

From a user's perspective, system 100 provides the user with useful graphical and report representations of how well given test cases actually tested a software program under test. At the most general level, system 100 provides the user with information as to how much of the program, and which particular portions, were executed during the test. System 100 accomplishes this by combining run-time data from the debuggers 111/121, 112/122 with static data from analyzer 113/123. Debuggers 111/121, 112/122 provide information about which program statements were executed during the test, and analyzer 113/123 provides graphical display of how those statements are related in the program.

More specifically from the user's viewpoint system 100 is operated as follows. First, the user starts the batch or CICS debugger 111/121 or 112/122 that corresponds to the program under test, and loads the program to be tested. The appropriate debugger is extended to present the user with a menu item to "begin test coverage." In the case of either debugger, this will cause an execution counter to be set for each statement in the program under test with an initial value of 0. The user is also given the option to set normal breakpoints to control program execution. The user then executes whatever conventional tests are desired, and when the tests are complete, selects a "save coverage data" menu item to save the results on the user's workstation. In a preferred embodiment, if the user attempts to exit the debugger before saving the results, the user is prompted by the debugger to save it before exiting. The data saved as a result consists of the line number and count (i.e., number of times executed) for each line of the program that was executed. The data are saved in storage subsystem 130.

Once such data have been saved, the user operates the conventional portion of the analyzer 128 to load in and analyze the static structure of the program under test. Specifically, in a preferred embodiment, this is done by executing the analyzer program with the name of the file containing the program as a parameter. For example, the following command will analyze the program MYPROG.CBL:

XPPANLZ MYPROG.CBL.

Figure 2:
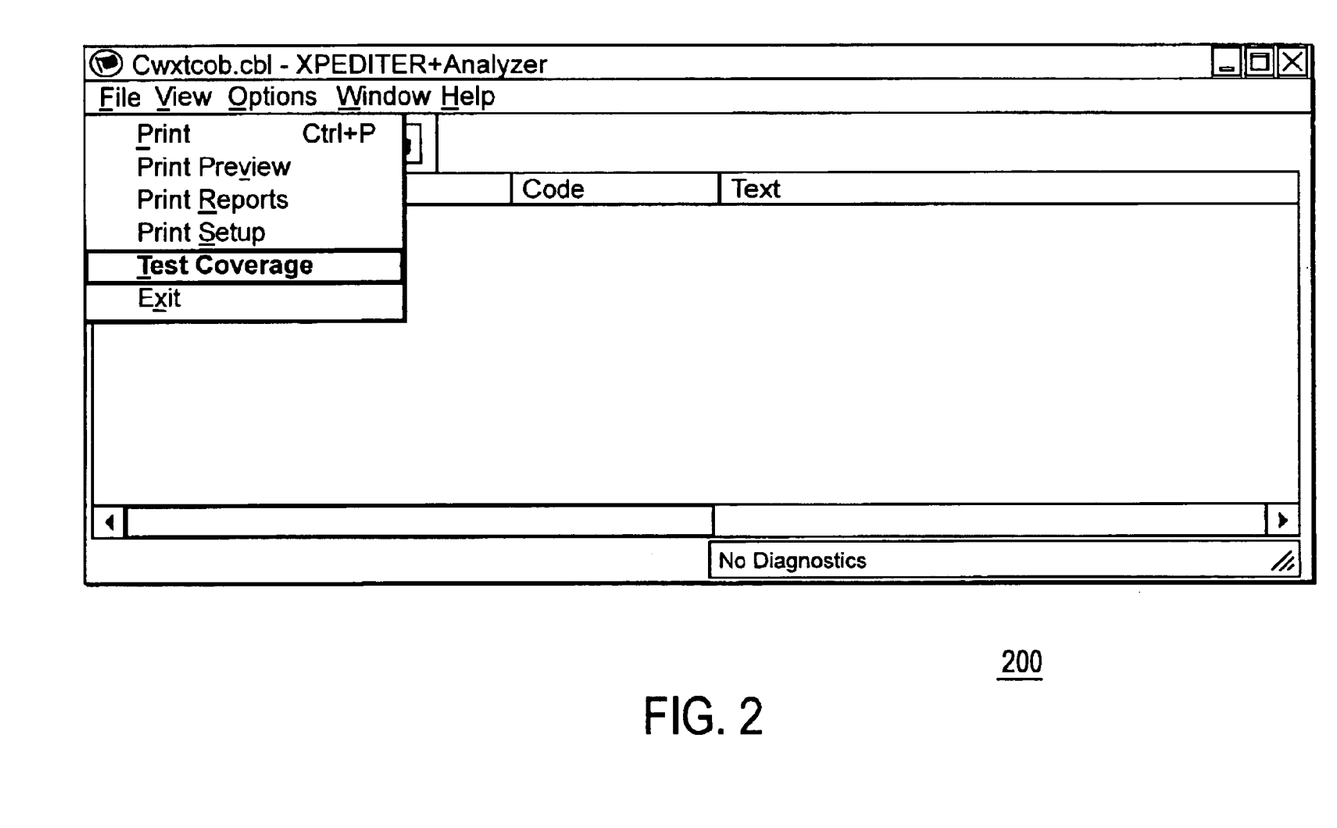
FIG. 2 is an analyzer menu portion of a user interface of the embodiment of FIG. 1 in accordance with the present invention.

By performing conventional static analysis of the program at this point, the user ensures that all program files have correctly been loaded into the user's workstation and that test coverage analysis can later be performed successfully. Referring now also to FIG. 2, a user interface implemented by the analyzer 113/123 provides a menu 200 including a choice to commence test coverage, and when the user makes this choice analyzer 113/123 permits the user to select one or more coverage files previously created and stored in storage subsystem 130 as described above. In a preferred embodiment, if conventional analysis was not successful, menu 200 will not allow the user to choose to commence test coverage, thus indicating to the user that conventional analysis needs to be completed. Also in a preferred embodiment, the user can re-select the "test coverage" choice on menu 200 as desired to add more test results to the current analysis session.

When the user's selections are complete, analyzer 113/123 provides the user with three representations of the test results: a first representation at the statement level via summary reports; a second graphical representation via a structure chart; and a third, also graphical, representation via control flow diagrams. Each of these is described in greater detail below.

If, based on the information presented in one of these manners to the user, the user determines that additional testing is required, the user can generate additional coverage files by re-running the corresponding debugger with additional data or under different test conditions. The results of this additional testing can then be imported into an existing analysis session or a new session, reflecting all of the cumulative test results.

Turning now from an operation perspective to an implementation perspective, in a preferred embodiment conventional debuggers and a conventional analyzer are used as the foundation for system 100, and are extended to provide the operation described above.

Specifically, each of the debuggers 111/121, 112/122 is configured so that when the user selects a "begin test coverage" menu choice, the debugger will cause a "count all" command to be sent from the user's workstation 120 to the mainframe computer 110 executing the test program. As a result, whenever a program statement is executed, the debugger increments the statement's execution count in mainframe memory.

In addition, when the program under test encounters a breakpoint (or the end of the program), the debugger is configured to download all of the count information generated on the mainframe computer 110 to the local memory of the user's workstation 120. In an alternative embodiment that may be advantageous for large or complex programs under test, this download does not occur until the user explicitly directs it via a menu choice or other command. Once downloaded to the temporary memory of the workstation 130 (e.g., workstation RAM), the data are available for the user to save to storage using the "save coverage data" menu choice described above.

In a preferred embodiment, the "save coverage data" menu choice stores the count information to a file in a "COVERAGE" subdirectory of the workstation 120, where the workbench is installed. In a preferred embodiment, the file name used for the data is set to be the name of the program under test with a numeric extension automatically generated for each test. For example, if the program under test is named "GARMENT", the first time the user saves coverage data the file name used will be GARMENT.001 and the next time the user saves coverage data the file name used will be GARMENT.002.

In a preferred embodiment, debuggers 111/121 and 112/122 each store the data in a binary file with the format shown in table 1 below.

TABLE 1

| Size | Type | Description |
| --- | --- | --- |
| 8 | Char | Module name |
| 8 | Char | Compile date |
| 8 | Char | Compile time |
| 8 | Char | Current date |
| 8 | Char | Current time |
| 4 | unsigned long | Number of counts |
| 4 | unsigned long | Line number |
| 4 | unsigned long | Execution count |

The last two elements shown in Table 1 are repeated "number of counts" times in the file.

Once the data have been saved, the user is given the option of running more tests and saving the results in a new file, or resetting all counts before running additional tests. The first option permits the user to create files with cumulative data as described above, while the second permits the user to record each test separately. If the data are stored in separate files, the analyzer 113/123 can be used to import these separate files at a later time to provide cumulative results. This gives the user the flexibility to view the results individually or cumulatively.

Figure 3:
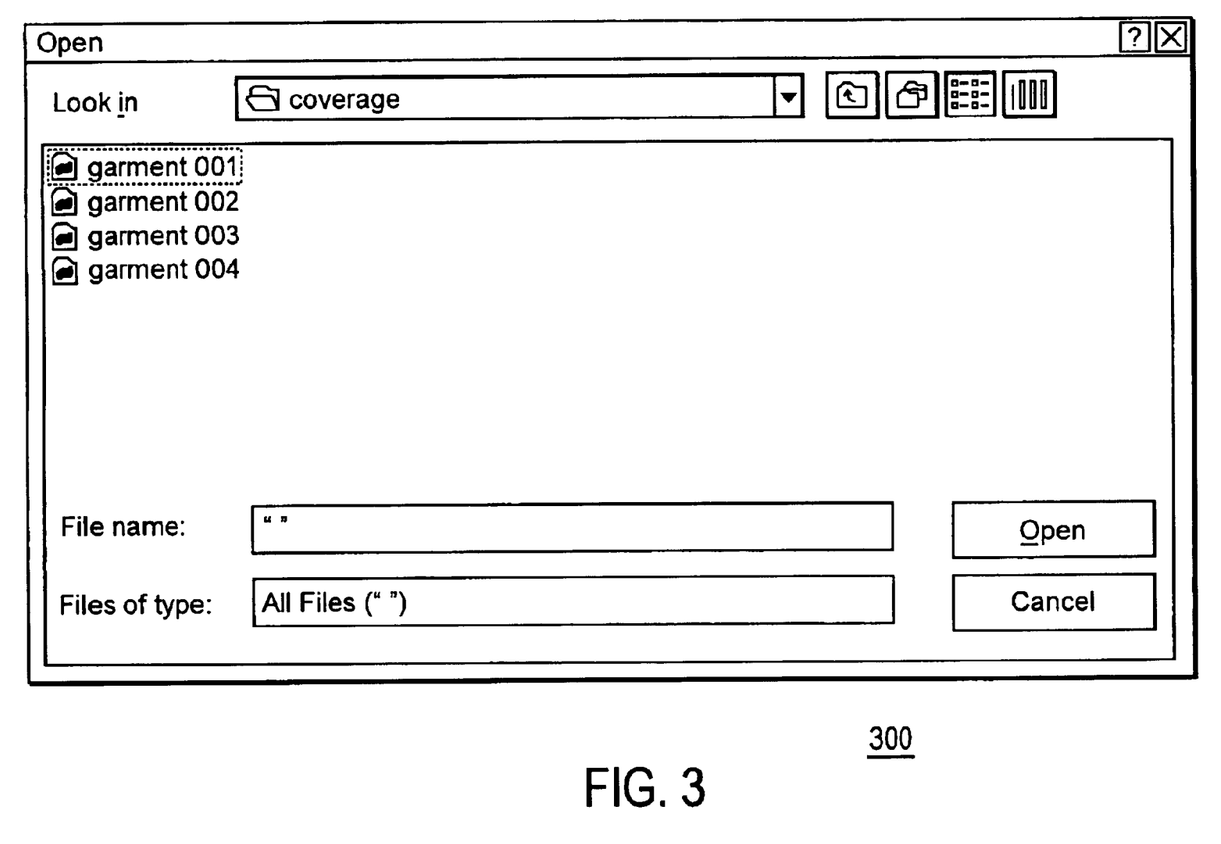
FIG. 3 is an open file dialog portion of the user interface in accordance with the present invention.

Once the desired data files are saved, the user commences operation of the analyzer 113/123 portion of system 100. Upon selection of the "Test Coverage" choice from menu 200 as described above, a conventional Windows dialog box is presented to the user for selection of one or more files to load. Continuing the example discussed above, if there were four data files generated for the GARMENT program, the dialog 300 of FIG. 3 is presented to the user in the preferred embodiment. Analyzer 140 is configured to read the line and count information from each file selected from such dialog 300.

Analyzer 113/123 performs its operations in two major phases: syntax checking (or "parsing") and analysis. If desired by the user, analyzer 113/123 also undertakes a third phase of determining code coverage.

During syntax checking, in the case of a COBOL program under test, each line of the program under test is read and stored in an in-memory object. Each line is then parsed, the syntax is checked, and a statement (Stmt) object is created for each statement on each line, in a conventional manner.

Once the syntax checking, or parsing, phase is complete, the actual analysis of the code begins. Analysis includes reporting code flaws, producing graphs, generating data flow information, and in the embodiment discussed herein, applying Code Coverage data. Analysis commences by a process known as "path walk" that gathers analysis information. In a preferred embodiment, a module CBLProg::DoPathWalk( ) implements this process. The path walk algorithm starts at the entry point of the program under test and steps through each possible path in the program, during which it stores pertinent information about the statements in each path.

In a preferred embodiment, the path walk is implemented using a stack in a ControlGraph::ProcessStackForPathWalk method. A new ControlGraph object is created whenever an entry point or a COBOL PERFORM statement is encountered. Each statement in every ControlGraph is processed. When a conditional statement is processed, a new path is added to the ControlGraph stack. The pathwalk algorithm commences at the first statement of the PROCEDURE division of the program under test and traverses each possible processing path within the program from beginning to end. During analysis, all perform groups are identified, and each statement object is associated with one or more of these perform groups. A perform group is a set of one or more statements in a COBOL program that are executed as a group when called from another statement (the PERFORM statement). After the last statement in a perform group executes, the statement immediately after the calling statement executes. A perform group in a COBOL program is analogous to a function in other languages.

Analyzer 113/123 stores each of the statements within a perform group as a control flow graph. After the pathwalk algorithm is complete, a structure chart is created by combining the individual control flow graphs. The data in the control flow and structure graphs are then used to create the diagrams that are displayed and printed as part of the conventional analyzer.

Specifically, in a preferred embodiment, analyzer 113/123 stores each line of the COBOL program under test in an array of CBLString objects. The array is indexed by a statement number, known as sourceLine, relating to the corresponding line of the COBOL program. In a preferred embodiment, the underlying object used is conventional and has a format as shown in Table 2 below:

TABLE 2

```
class _export CBLString : public FormatString
{
private:
    Array<CharReplacement *>  *charReps;
    BOOL                      copybook;
    long                      fileLine;
    long                      sourceLine;
    short                     dot;
```

TABLE 2-continued

```
    String          *filename;
    unsigned int    stmtTypes;
    unsigned int    typeQualifiers;
    String          *col73to80;
}
```

Analyzer 113/123 modifies the object to include an additional field called unsigned int execution_count, which is initialized to zero when the original program is loaded. When each coverage data file is loaded, the count for each line is added to this field. This allows coverage files to be added at any time after the program is analyzed.

As previously mentioned, Statement objects are used to build the control flow and structure graphs. These objects contain both information about the statement itself and the original source line number. In a preferred embodiment, the statement object format used (pertinent portion shown) is that shown in Table 3:

TABLE 3

```
class _export Stmt : public Item
{
private:
    enum resolvedStatus {rsUnknown, rsAlways, rsSometimes, rsNever};
    BOOL        is_conditional;
    BOOL        is_invisible;
    BOOL        is_relevant;
    BOOL        isDead;
    BOOL        leader;         // basic block info (Aho pg 529)
    short       path_number;
    short       range_attr;
    short       scope;          // scoping level
    int         nodeNumber;     // used by the graph generator
protected:
```

TABLE 3-continued

```
    BOOL        performLoops;   // for perform stmts only
    KEYWORD *   keyword;        // Verb information
    long        fileLine;
    long        sourceLine;
    Reference   *reference1;    // list of fields referenced
    short       column;
    Stmt *      flowNext;       // next statement
```

Control Flow charts and structure charts are both derived from FlowGraph objects. Each FlowGraph has a graph member variable that is an array of Node structures. Each Node structure contains lists of "to" edges and "from" edges (lines that flow to and from a box in a graph), as well as a node_item. If the graph is for a Control Flow, the node_item is a Stmt object. If the graph is for a Structure chart, the node_item is a ControlGraph object.

Once the path walk has completed successfully, the Control Flow charts are built using a process that commences with the module CBLProg::BuildControlFlowCharts. A chart is built for each ControlGraph object that was created during the path walk. The process for creating the Control Flow charts is similar to the path walk in that a stack is used in the ControlGraph::ProcessStackForGraph method. Not all statements are graphed; a node in a Control Flow may represent one or many statements, but does not in a preferred embodiment represent more than one conditional statement.

After the Control Flow charts are built, the Structure Charts are built. One Structure Chart is built for every entry point in the program, with a node being created in the Structure Chart for every Control Flow chart.

As also mentioned previously, system 100 presents the user with information about test coverage on three levels: at the statement level, in summary form, and graphically. For display at the statement level, system 100 modifies a conventional source listing report to include an initial column showing the number of times the line has been executed, as shown below in Table 4:

TABLE 4

```
            000363***
            000364***  DIFFERENT PROCESSING OCCURS BASED ON EMPLOYEE TYPE. THERE
            000365***  ARE 3 VALID EMPLOYEE TYPES. IF A RECORD IS READ CONTAINING
            000366***  A RECORD TYPE OTHER THAN H, S OR M, AN ERROR MESSAGE IS
            000367***  WRITTEN AND PROCESSING CONTINUES.
            000368***
  0005      000369     1000-PROCESS-DATA.
  0005      000370         IF HOURLY
  0004      000371             PERFORM 2000-PROCESS-HOURLY
            000372         ELSE
  0001      000373             IF SALES
  0000***   000374                 PERFORM 3000-PROCESS-SALES
            000375             ELSE
  0001      000376                 IF MANAGEMENT
  0001      000377                     PERFORM 4000-PROCESS-MANAGEMENT
            000378                 ELSE
  0000***   000379                     MOVE ' INVALID EMPLOYEE TYPE ' TO ERROR-LINE
  0000***   000380                     WRITE REPORT-RECORD FROM ERROR-LINE.
  0005      000381         PERFORM 8000-READ-INPUT.
```

Figure 4:
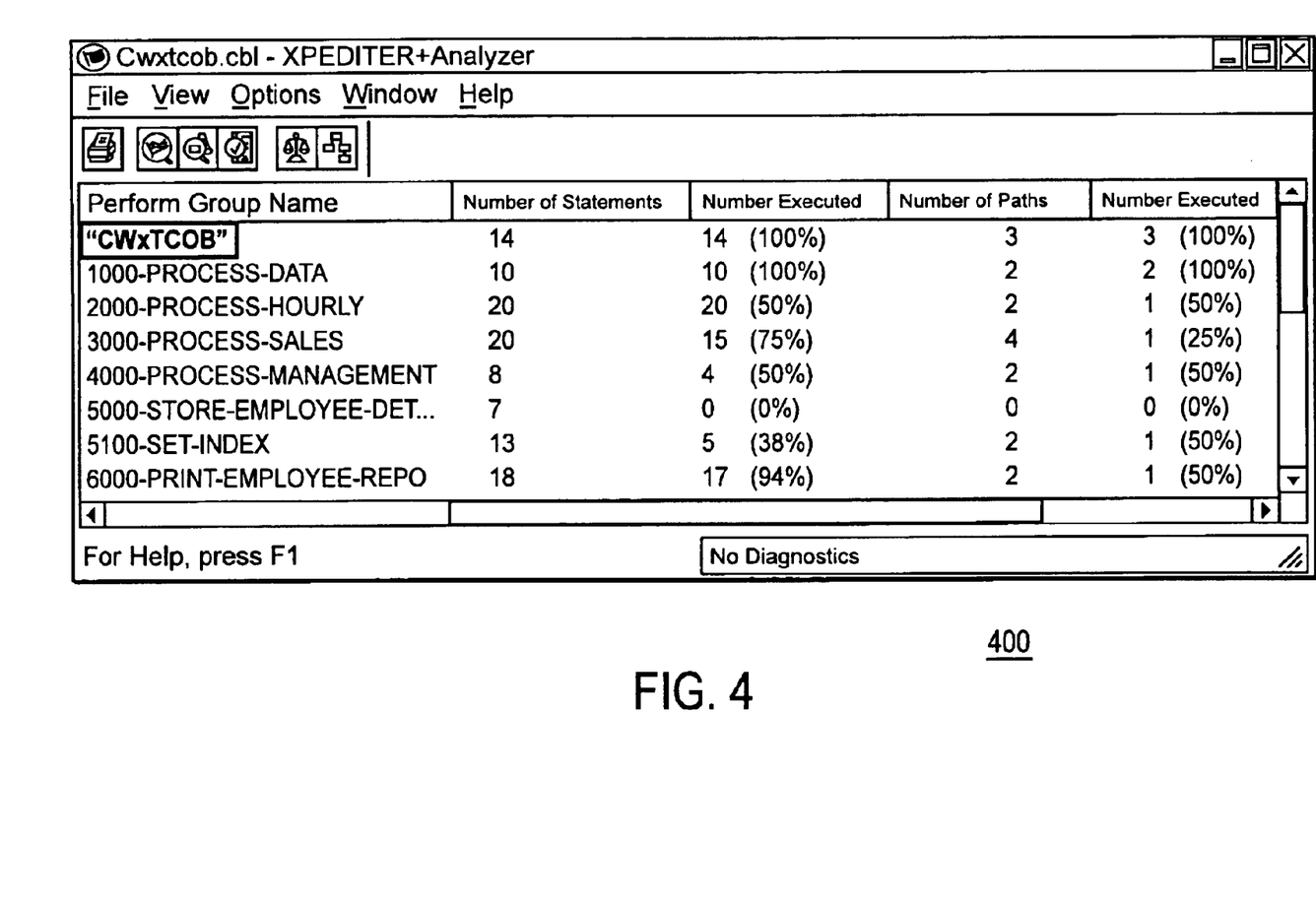
FIG. 4 is a perform group summary display portion of the user interface in accordance with the present invention.

System 100 presents summary information in two formats. The first, illustrated for example in the window 400 of FIG. 4, provides a row for each perform group and columns containing the number of statements, the number and percentage of statements executed, the number of paths, and the number and percentage of paths executed.

The number of paths represents the minimum number of unique paths that must be executed to test all logic. In a preferred embodiment, the analyzer 113/123 uses an algorithm to determine from the execution data whether or not a particular logical path in the program has been executed.

The algorithm determines whether a path has been taken based on the number of times the decision block has been executed and the number of times the statements coming out of the decision block have been executed. If a decision block has been executed more times than the statement(s) coming out of the decision block, then, as long as the statement(s) coming out of the decision block have been executed at least once, it is certain that all of the paths out of the decision block have been executed.

For example, consider the program discussed previously and reprinted below:

begin
 b=input data;
 if b>0, then b=b+3;
 output=sqrt(b);
 end.

In this case, if the decision block (if b>0) has been executed three times, and the statement leading out of the decision block (then b=b+3) has been executed twice, then it is known that path 1:

if b>0
 then b=b+3
 output=sqrt(b)

has been executed (in the above example, it has been executed twice). Also, it is known that path 2:

if b>0
 output=sqrt(b)

has been executed (in the above example, it has been executed once). Thus, it is known all paths leading from this decision block have been executed.

If the decision block has been executed the same number of times as the statements leading out of the decision block, then it is known that only the paths incorporating the statements leading out of the decision block have been executed. Any paths that do not incorporate the statements leading out of the decision block have not been executed. In the above example, if the decision block has been executed twice and the statement leading out of the decision block has been executed twice, then it is known that path 1 has executed, and path 2 has not executed.

If the statements coming out of the decision block have not been executed, and the decision block has been executed, then it is known that only the path that does not involve the statements coming out of the decision block have been executed. In the above example, if the decision block has executed twice, and the 'then' statement has not been executed, then it is known that path 2 has been executed twice, and path 1 has not been executed at all. Finally, if the decision block has not been executed, then it is known that all paths coming out of the decision block have not been executed.

Figure 5:
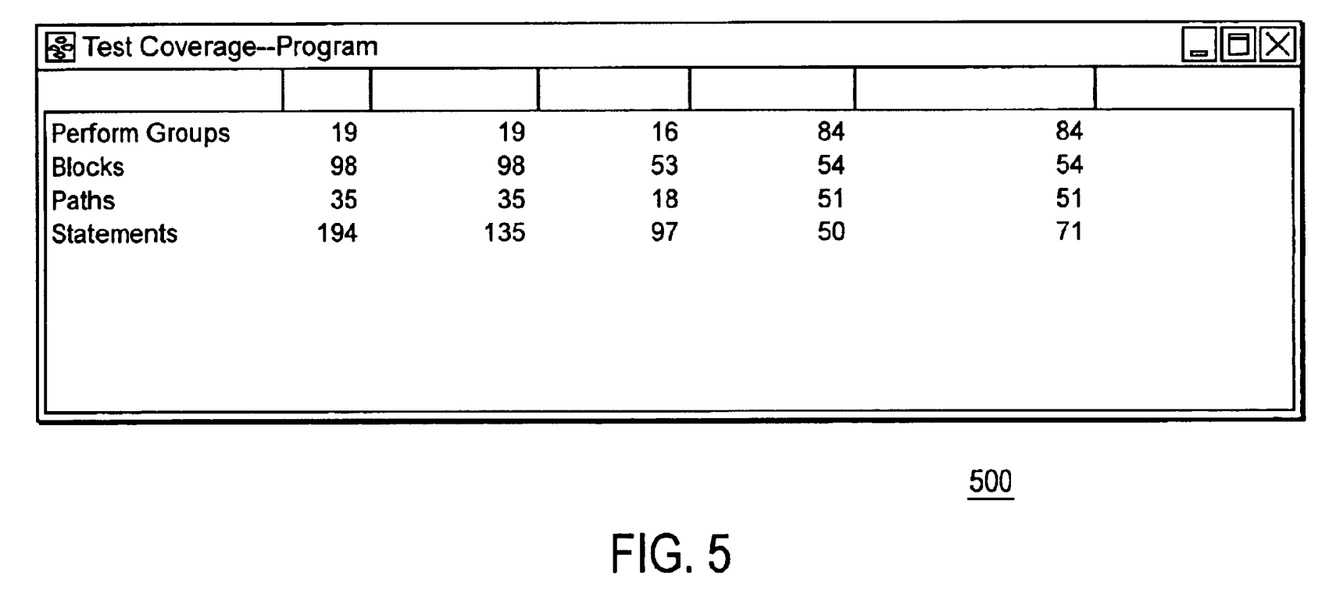
FIG. 5 is a test coverage statistics display portion of the user interface in accordance with the present invention.

The second formnat of summary information is presented for the overall program under test. Referring now to FIG. 5, window 500 displays the total number of perform groups, blocks (i.e., one or more sequential non-conditional statements, or a single conditional statement), paths (i.e., a set of blocks connecting the entry point of a perform group to the exit), and statements, as well as the number and percentage of those that were monitored (i.e., specifically selected through the debugger for test coverage analysis) and executed.

In a preferred embodiment, the user may choose to print any of the windows, e.g., 500, that are displayed on the user's workstation.

Figure 6:
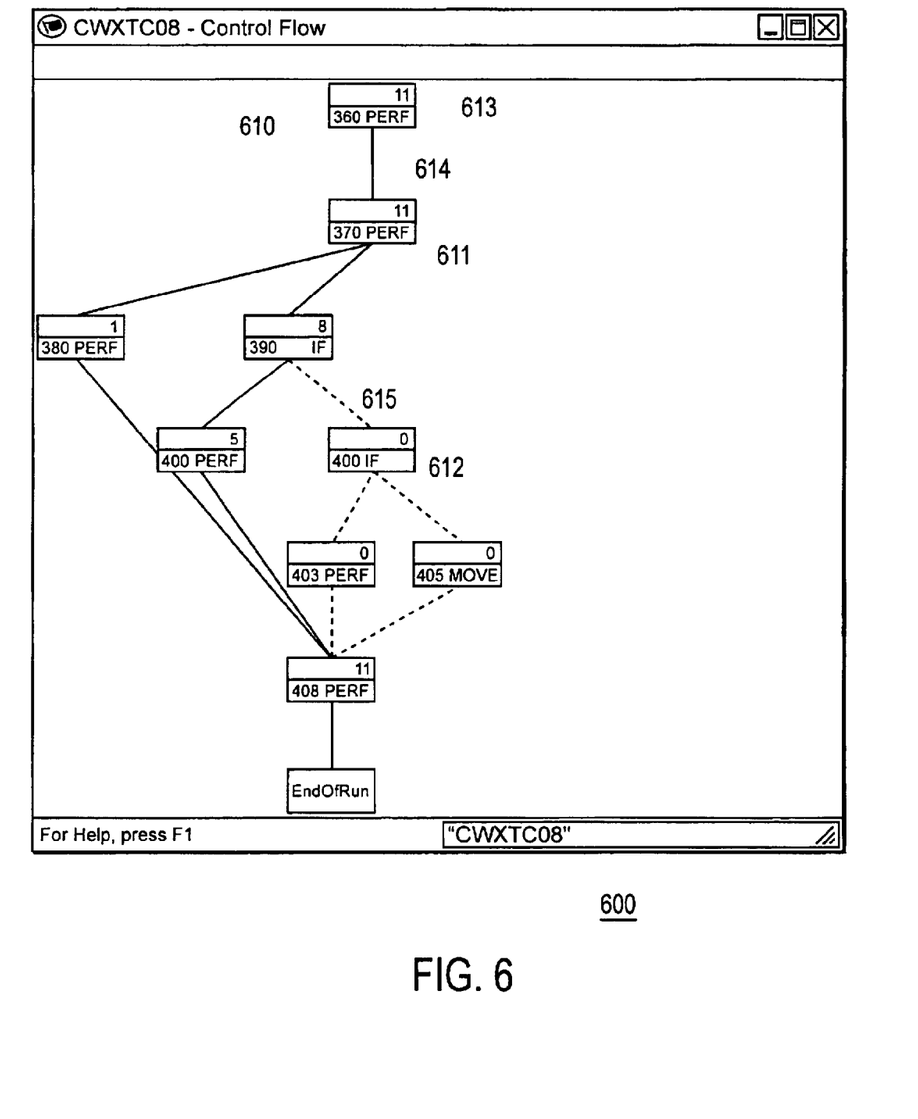
FIG. 6 is a control flow diagram portion of the user interface in accordance with the present invention.

Referring now to FIG. 6, coverage information is displayed graphically in control flow diagrams and structure charts using colors and numbers. Specifically, in a control flow diagram, e.g., 600, each box, e.g., 613, represents either a conditional or non-conditional statement of the program under test. When coverage data are loaded for the program under test, a number (e.g., 11 for box 613) is displayed in the upper portion of each box showing how many times the corresponding statement has been executed in the testing. The corresponding code block line number and verb are displayed in the lower part of the box. Executed paths, e.g., 614 are displayed differently than unexecuted paths, e.g., 615. In a preferred embodiment, the former are displayed by blue solid lines while the latter are displayed by red dashed lines; green lines are used for inconclusive or unmonitored results. Likewise, executed statements, e.g., 613, 611 are displayed differently than unexecuted statements, e.g., 612. In a preferred embodiment, executed statements are displayed as gray boxes while unexecuted statements are displayed as yellow boxes.

Figure 7:
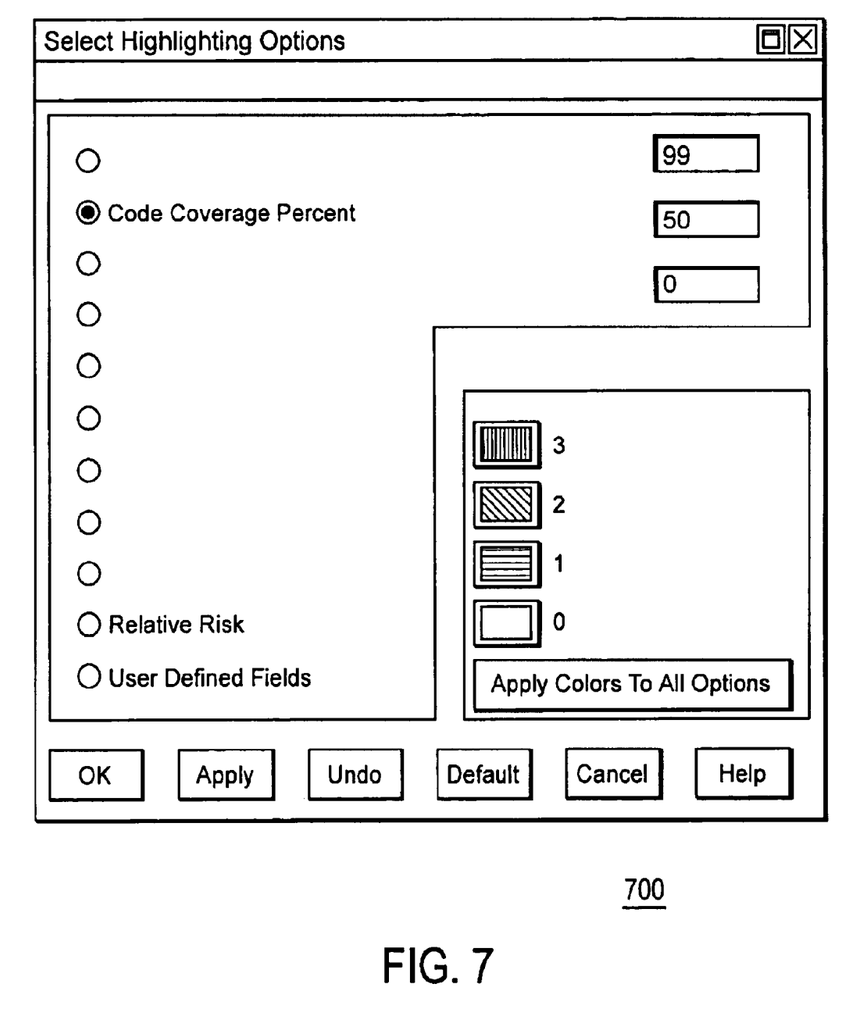
FIG. 7 is a highlighting options portion of the user interface in accordance with the present invention.

Similarly, system 100 displays coverage results graphically using colors in a structure chart. In a preferred embodiment, a user is presented with a selection of highlighting options as shown in window 700 of FIG. 7. Using this device, the user can select attributes of the program to emphasize and can further set threshold levels for each color to be displayed. For the example shown in FIG. 7, the relevant option is Code Coverage Percent. Selecting this option allows the user to assign different colors to the boxes on the structure chart depending on the percentage of statements within the box that were executed. In a preferred embodiment, as a default a gray box indicates 100% coverage, a blue box indicates 51–99% coverage, a green box indicates 1–50% coverage, and a yellow box indicates 0% coverage.

Figure 8:
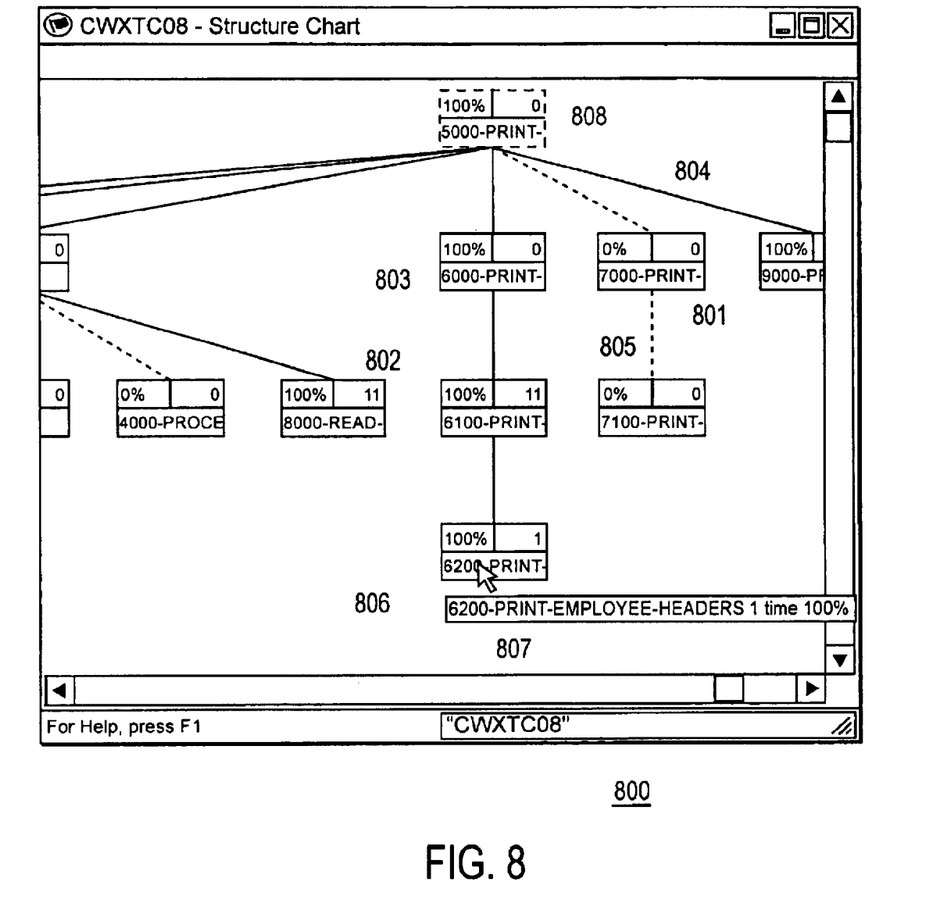
FIG. 8 is a structure chart display portion of the user interface in accordance with the present invention.

Referring now to FIG. 8, there is shown an exemplary structure chart 800 in accordance with the present invention. In this case, each box, e.g., 801, corresponds to a perform group. Numbers, e.g., 11 in box 802, are displayed in the upper-right comer of the box to indicate the number of times the perform group has been called; lines, e.g., 804, again represent paths. Numbers, e.g., 100% in box 802, are displayed in the upper-left comer of the box to indicate the percentage of the statements within the perform group that have been executed. The perform group name is provided in the bottom portion of the box. As with the flow display, in a preferred embodiment the use of the colors and dashed lines indicates unexecuted paths, e.g., 801 and 805. In a preferred embodiment, a blue line represents an executed path, a red dashed line represents an unexecuted path, and a green line represents an inconclusive or unmonitored path. An inconclusive path is one that may or may not have been followed; it is inconclusive because the analyzer is unable to determine if the path was followed. An unmonitored path includes statements for which the user did not set a count breakpoint on in the debugger; no code coverage data are collected for statements without counts in a preferred embodiment. For user convenience, when a cursor 806 is positioned over a box corresponding to a perform group, a description 807 of that perform group is displayed on chart 800. Chart 800 provides an easy way for a user to quickly identify which parts of a program have been executed during a test and which have not. If a perform group is only partially covered as indicated by a percentage less than 100%, it is straightforward to display the control flow diagram and see which paths were not executed by clicking the right mouse button on the box and selecting the Control Flow item on the popup menu.

In a preferred embodiment, the user may select to display only a portion of a program's structure chart, allowing the user to quickly focus in on parts of the program believed to be most impacted by a particular code change. This is accomplished by clicking the right mouse button on the chart background and selecting the Set Chart Depth menu item.

Also in a preferred embodiment, system 100 permits a user to invoke a "Find Indirect" feature in which the user can select a data item and then identify all other data items moved into or out of that one. For example, assume that the programmer changes a data item called HIRE-YEAR from a 2-digit field to a 4-digit field. Assume further that the program contains a statement like: "MOVE HIRE-YEAR TO A-YEAR". The find indirect operation on the data be item HIRE-YEAR will identify A-YEAR, as a programmer in this situation would typically want to test not only all of the code that references HIRE-YEAR, but also all of the code that references A-YEAR. Specifically, the feature highlights on structure chart 800 each perform group that contains one of the selected data names in red. This can result in time savings during testing since the user can quickly identify which perform groups that use a data field impacted by a code change have been executed during the testing done subsequent to that code change.

As described above, a user is provided a menu for loading a coverage file generated by one of the debuggers 111/121 or 112/122. As described in Table 1 above, this coverage file contains an array of line numbers and execution frequencies. A LoadTestCoverage method in CBLProg takes the line numbers and matches them with CBLStrings, as well as applying corresponding execution frequencies. Then, a CalcCoverageData method of each ControlGraph is called to apply the execution data to the Control Flows. Execution frequencies are applied to both the Nodes and the Edges of the graphs, and from this information the path coverage is calculated. Structure Charts are similarly processed. The charts are then rendered with graphical attributes such as lines and boxes, as described above.

When the charts are rendered, corresponding lines and boxes with different attributes showing coverage are drawn as previously discussed.

One practical advantage of system 100 is that it does not require any significant modification to existing mainframe debugging portions of existing debugging tools. Rather, system 100 is built upon these tools through the use of additional code portions resident only on the user's workstation.

From the above description, it will be apparent that the invention disclosed herein provides a novel and advantageous system and method to measure and report on the effectiveness of software program testing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented system for analyzing testing of a computer program, the computer program having lines of code and logical paths, each of the logical paths being comprised of a corresponding subset of the lines of code, the system comprising:

a debugging tool subsystem configured to collect information about particular lines of code that are executed during testing of the program; and an analyzer subsystem in communication with the debugging tool subsystem, which determines a structural representation of the program, including a number of unique logical paths, and generates in connection with the information collected by the debugging tool subsystem an indication of which ones of the unique logical paths have been or have not been executed during testing of the program according to the structural representation.

wherein the program comprises a decision point, the decision point branching into a plurality of unique logical paths, and wherein the analyzer subsystem compares a number of executions of a statement following a decision point with a number of executions of the decision point to determine execution of each of the unique logical paths during testing of the program.

2. The system of claim 1, wherein the analyzer subsystem further comprises an output module producing at least one of a control flow diagram or a structure chart responsive to which ones of the unique logical paths have been executed during testing of the program.

3. The system of claim 1, wherein the debugging tool subsystem is implemented as a processing component on a mainframe computer and as an interface component on a workstation computer.

4. The system of claim 1, wherein the analyzer subsystem further comprises an output module generating a structural diagram representative of logical decision points of the computer program.

5. The system of claim 1, wherein the debugging tool subsystem is configured to record data corresponding to how many times a given statement in the computer program is executed, and wherein the analyzer subsystem is adapted to receive the data and present output to a user in response thereto.

6. The system of claim 1, wherein, responsive to the number of executions of a statement on a first unique logical path following a decision point being equal to the number of executions of the decision point, the analyzer subsystem determines that a statement on a second unique logical path following the decision point was not executed.

7. The system of claim 1, wherein the debugging tool subsystem includes an unmodified conventional mainframe program debugging tool.

8. The system of claim 1, wherein the debugging tool subsystem is configured to issue a command to increment a counter in a memory whenever a particular statement in the computer program is executed.

9. The system of claim 8, wherein the debugging tool subsystem is configured to collect information on the number of times particular statements in the computer program are executed by downloading that information from the memory upon execution reaching one of a breakpoint and an indication of end of processing for the computer program being tested.

10. The system of claim 9, wherein the memory is in a mainframe computer system and wherein the information is downloaded from the mainframe computer system to a user workstation.

11. The system of claim 9, wherein the information is saved as code coverage data to a file on a user workstation.

12. The system of claim 11, wherein the debugging tool subsystem is configured to save the information in sequentially named files, each of said files being cumulative of information obtained from prior and current testing within the same debugging session of the computer program.

13. The system of claim 12, wherein the system is configured to present the user with a choice of starting a new series of tests independent of prior testing results or combining results from the new test with results from prior tests with the combining being done in the analyzer subsystem.

14. The system of claim 1, wherein the system includes an output subsystem that presents a user with testing results in any of the following three forms responsive to user selection; statement level results, summary level results, graphical results.

15. The system of claim 1, wherein the system includes an output subsystem that displays distinctions in logical path execution status and statement execution status using colors and numbers in control flow diagrams and structure charts.

16. The system of claim 15, wherein the output subsystem displays a number corresponding with a program statement indicating how many times the statement has been executed.

17. The system of claim 1, wherein the analyzer subsystem is configured to accept as input a selection of a portion of a program to test.

18. The system of claim 1, wherein the computer program to be tested is not modified by the analyzer subsystem.

19. The system of claim 1, wherein the computer program to be tested is a compiled version of the computer program.

20. A method for testing a computer program, the computer program having lines of code and logical paths, each of the logical paths being comprised of a corresponding subset of the lines of code, the method comprising:

receiving information from a debugger about particular lines of code that are executed during testing of the program;

determining a structural representation of the program, including a minimum number of unique logical paths, responsive to the collected information;

comparing a number of times a statement following a decision point has been executed with a number of times the decision point has been executed;

determining, responsive to the comparison, whether one or both of two logical paths following the decision point have been executed during testing of the program; and generating, responsive to the received information, the determined structural representation, and the determination of whether one or both of two logical paths has been executed during testing of a program, an indication of which ones of the unique logical paths have been or have not been executed during testing of the program.

21. The system of claim 20 further comprising:
displaying a control flaw diagram responsive to which ones of the unique logical paths have been executing during testing of the program.

22. The system of claim 20 further comprising:
producing a structure chart responsive to which ones of the unique logical paths have been executing during testing of the program.

23. The system of claim 20 further comprising:
generating a structural diagram representative of logical decision points of the computer program responsive to the determined structural representation.

24. The system of claim 20, further comprising
recording data corresponding to how many times a given statement in the computer program is executed; and
displaying the recorded data to a user in response thereto.

25. The system of claim 20, wherein the step of determining further comprises:
determining whether a second unique logical path following the decision point is executed in response to execution of a decision point more times than execution of a statement on a first unique logical path following the decision point.

26. The system of claim 20 further comprising:
causing the debugger to increment a counter in a memory whenever a particular statement in the computer program is executed.

27. The system of claim 26 wherein collecting information about particular lines of code that are executed during testing of the program further comprises:
collecting information on a number of times particular statements in the computer program are executed by downloading that information from the memory upon execution reaching one of a breakpoint and an indication of end of processing for the computer program being tested.

28. The system of claim 27 further comprising:
saving the collected information as code coverage data to a file on a user workstation.

29. The system of claim 28 wherein saving further comprises:
saving the collected information in sequentially named files, each of said files being cumulative of information obtained from prior and current testing within the same debugging session of the computer program.

30. The system of claim 29 further comprising:
displaying to a user a choice of starting a new series of tests independent of prior testing results.

31. The system of claim 26 further comprising:
downloading count information from the memory, where the memory is in a mainframe computer running the computer program and the debugger.

32. The system of claim 20 further comprising:
combining results from the new test with results from prior tests.

33. The system of claim 20 wherein generating further comprises:
displaying testing results in any of the following three forms responsive to user selection: statement level results, summary level results, graphical results.

34. The system of claim 20 wherein generating further comprises:
displaying distinctions in logical path execution status and statement execution status using colors and numbers in control flow diagrams and structure charts.

35. The system of claim 34 further comprising:
displaying a number corresponding with a program statement indicating how many times the statement has been executed.

36. The system of claim 20 further comprising:
receiving as input a selection of a portion of a program to test.

* * * * *

UNITED STATES PATENT AND TRADEMARK OFFICE
CERTIFICATE OF CORRECTION

PATENT NO. : 6,959,431 B1
DATED : October 25, 2005
INVENTOR(S) : Pamela L. Shiels et al.

It is certified that error appears in the above-identified patent and that said Letters Patent is hereby corrected as shown below:

<u>Column 15,</u>
Line 50, delete "flaw" and insert -- flow --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,959,431 B1  
APPLICATION NO. : 09/504219  
DATED : October 25, 2005  
INVENTOR(S) : Shiels et al.

Page 1 of 1

It is certified that error appears in the above-identified patent and that said Letters Patent is hereby corrected as shown below:

Column 14, Line 9,

Delete "." and please insert --,--

Signed and Sealed this

Twenty-ninth Day of May, 2007

JON W. DUDAS  
*Director of the United States Patent and Trademark Office*